April 29, 1952 R. W. GOFF 2,594,911

CAM MECHANISM

Filed May 28, 1949

Inventor:
Robert W. Goff,
by His Attorney.

Patented Apr. 29, 1952

2,594,911

UNITED STATES PATENT OFFICE 2,594,911

CAM MECHANISM

Robert W. Goff, Schenectady, N. Y., assignor to General Electric Company, a corporation of New York Application May 28, 1949, Serial No. 95,907

3 Claims. (Cl. 74—568)

My invention relates to cam mechanisms and more particularly to cam mechanisms having a plurality of adjustable cams.

The primary object of the invention is to provide a new and novel cam mechanism having a plurality of cam carrying rings which can be readily adjusted to any angular position on a shaft, and which can then be locked and held firmly in the adjusted position.

Other objects and advantages of the invention will be apparent from the following description thereof, and the novel features of the invention are particularly pointed out in the appended claims.

In carrying out my invention in one form, I provide a base having an upwardly projecting vertical spindle. A gear, arranged to be driven by a worm, is rotatably positioned on the spindle. The gear has an upper hub portion around which two cam carrying rings are loosely positioned. The two rings are held firmly in a fixed relation with respect to the gear during operation of the mechanism by means of a cover plate which is bolted to the hub so that it presses the rings against a portion of the gear below the hub portion. The cam rings are adjustable angularly when the cover plate is loosened by means of teeth on the inner circular surface of each, and pinions which engage these teeth. The pinions are positioned on short stub shafts within openings in the hub, with a separate pinion engaging each cam ring. Each pinion with its associated shaft is biased by a compression spring which produces sufficient friction that each cam ring is independently adjustable, that is, each individual gear train has sufficient friction that the cam ring in one train will not move when another cam ring is adjusted.

Figure 1:
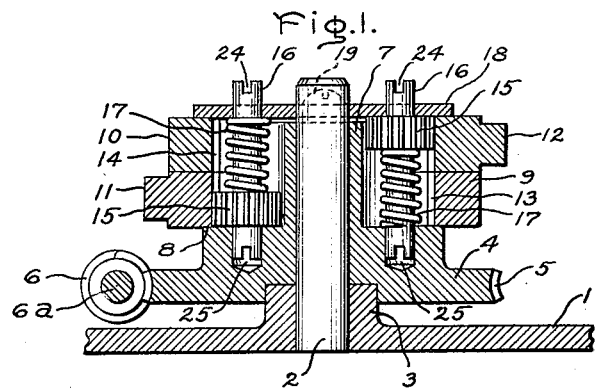
Figure 2:
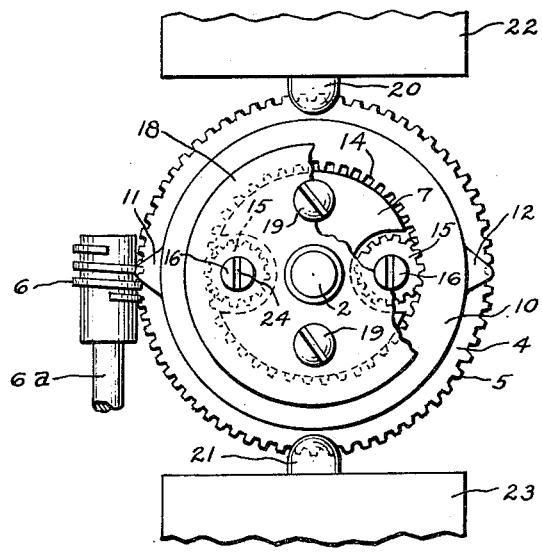

For a clearer and more complete understanding of my invention, reference should be had to the accompanying drawing, Fig. 1 of which is a sectional side view of a preferred embodiment of the invention; while Fig. 2 is a top view of this embodiment which is partially cut away to show the details of construction.

As shown in Fig. 1 of the drawing, the mechanism is supported by a horizontal base 1. The base has an opening in which a vertical spindle 2 is positioned, and there is a circular hub portion 3 of the base disposed concentrically around the spindle. A circular gear member 4 is rotatably positioned on spindle 2 and is supported by hub 3. Member 4 has an outer perimetral toothed portion 5, while a worm 6 engages the teeth on portion 5 to provide for the rotation of the gear member. Worm 6 may be rotated either continuously or intermittently in either direction by any suitable means (not shown) coupled to shaft 6a.

The upper portion of rotatable member 4, as best seen in Fig. 2, is provided with a circular hub 7 of reduced diameter which is separated from the body portion of member 4 by a shoulder 8. Two circular cam carrying rings 9 and 10 are loosely positioned in vertical stacked relation around hub 7 where they are supported by shoulder 8. Ring 9 has a cam projection 11 extending radially outward therefrom, while ring 10 has a similar cam projection 12. The inner circular surfaces of cam rings 9 and 10 are provided, respectively, with toothed portions 13 and 14 which are engaged by a pair of pinions 15. Pinions 15 are positioned within two diametrically opposite axially disposed openings in hub 7, and each pinion is firmly mounted on a stub shaft 16. The lower ends of shafts 16 are journalled in holes 25 at the bottom of the openings in hub 7, with the two shaft and pinion assemblies being oppositely disposed so that one pinion engages toothed portion 13 on ring 9 and the other pinion engages toothed portion 14 on ring 10. Each shaft and pinion is provided with a helical compression spring 17 around the shaft which biases the pinion against the bottom of the opening in hub 7 in one case and against a cover plate 18 in the other case.

Cover plate 18 is secured to the top of hub 7 by bolts 19, or other suitable means. During operation of the cam mechanism, bolts 19 are securely tightened so that cover plate 18 presses the cam rings 10 and 9 firmly into engagement with each other and with shoulder 8 on rotatable member 4 whereby a unitary rotating structure is formed. As this structure rotates, projections 11 and 12 on the cam rings engage two contact members, 20 and 21, respectively, at regularly recurring intervals. Members 20 and 21 may be utilized to operate electric switches, as represented by numerals 22 and 23, or other suitable devices.

If it is desired to change the angular relation between cams 11 and 12 in order to change the intervals at which the cams engage members 20 and 21, it is necessary only to loosen cover plate 18 slightly and rotate one of pinions 15 by means of a screwdriver slot 24, which is provided at the upper end of each shaft 16. The lower ends of shafts 16 are also provided with screwdriver slots, but this is merely to make it possible to use two identical pinion and shaft assemblies in the cam mechanism by reversing the shaft and pinion in one of the openings in the hub. When cover plate 18 is loosened slightly, it is possible to rotate either cam ring independently of the other by rotating the corresponding meshing pinion, because the friction produced by compression spring 17 on the opposite pinion and cam ring causes the latter cam ring to remain stationary. Thus, the angular location of cams 11 and 12 may be readily adjusted, after which cover plate 18 is again tightened down to make the mechanism ready for further operation.

While I have illustrated and described a preferred form of my invention embodying two cam carrying rings, it will be readily apparent that three or more cam carrying rings may be used if it is desired to have three or more axially aligned circular cam paths. Also, a single ring may be used satisfactorily. In addition, it is readily apparent that each cam ring may be equipped with two or more cam projections, if this is desired, to secure different operating intervals. Accordingly, while I have illustrated and described a preferred embodiment of my invention, many modifications thereof may be made and, therefore, it should be understood that I intend to cover, by the appended claims, all modifications which fall within the true spirit and scope of my invention.

What I claim as new and desire to secure by Letters Patent of the United States is:

1. An adjustable cam device comprising a rotatable member having a peripherally toothed portion and a recessed hub adjacent thereto and provided with axially disposed openings therein, cam rings having internal toothed portions positioned around said hub, a releasable cover plate secured to the end of said hub opposite said toothed portion and in engagement with one of said rings for pressing said rings into firm engagement with said rotatable member and means for adjusting the angular positions of said cam rings on said hub including individual shafts positioned in said openings, pinions mounted thereon and in respective engagement with said toothed portions and compression springs coiled respectively around said individual shafts to bias said pinions towards the rings corresponding thereto and selectively to bias said pinions toward said hub or said cover plate to provide frictional relationships between said rings and said hub for individual operation of said pinions when said plate is loosened on said member.

2. An adjustable cam device comprising a rotatable member having an annular toothed portion and a recessed circular hub adjacent thereto and provided with a plurality of openings therein, a plurality of circular cam carrying members positioned around said hub and having internal toothed portions communicating into said openings, a removable cover plate secured to the hub end of said rotatable member and in engagement with one of said cam carrying members for holding said members in a fixed position on said hub during normal operation and means for adjusting the relative angular positions of said cam carrying members comprising a plurality of shafts journalled in said hub openings, pinions mounted on said shafts and in engagement respectively with said toothed portions and an equal number of compression springs coiled respectively about said shafts to bias said pinions towards the rings corresponding thereto and selectively to bias said pinions toward said hub or said cover plate to provide individual frictional relationships between said rings and said hub for adjustment of the angular position of each of said cam rings with respect to the remainder thereof when said cover plate is loosened on said rotatable member.

3. An adjustable cam mechanism comprising a base having an aperture therethrough, a spindle positioned in said aperture, a gear member rotatably positioned around said spindle and in engagement with said base, said gear member having an outer perimetral toothed portion for engaging a worm and an adjacent recessed circular hub concentric with the axis of said spindle and provided with a pair of axially disposed openings, a pair of circular cam carrying rings positioned around said hub and having internal toothed portions communicating into said openings, a releasable cover plate having a pair of circular apertures therethrough corresponding to said axial openings and secured to the end of said hub opposite said toothed portion, said cover plate being in spaced relation with said toothed portion and in engagement with one of said rings to press said rings into firm engagement with each other and with said gear member to form a unitary rotating structure during normal operation, means for adjusting the individual angular positions of said rings on said hub comprising a pair of individual shafts journalled at corresponding ends thereof in the bases of said hub openings and protruding through said apertures at the opposite ends thereof, a pair of pinions mounted on said shafts and positioned in oppositely disposed relation in said openings to engage said internal toothed portions, a pair of compression springs coiled around said individual shafts and biasing said pinions respectively against said gear member and said cover plate to position said pinions with respect to the rings corresponding thereto and to provide a frictional relationship between said rings and said gear member, screwdriver slots being provided in the ends of said shafts to form external means for adjustment of the angular position of either of said rings on said hub without movement of the other ring when said cover plate is loosened on said hub.

ROBERT W. GOFF.

REFERENCES CITED

The following references are of record in the file of this patent:

UNITED STATES PATENTS

| Number | Name | Date |
|---|---|---|
| 1,684,064 | Miller | Sept. 11, 1928 |
| 1,793,051 | Butler | Feb. 17, 1931 |
| 2,379,545 | Silva et al. | July 3, 1945 |
| 2,398,733 | Wenzel | Apr. 16, 1946 |
| 2,450,311 | Strunk et al. | Sept. 28, 1948 |